(12) United States Patent
Yan et al.

(10) Patent No.: US 9,619,743 B1
(45) Date of Patent: Apr. 11, 2017

(54) RFID DEVICE AND METHOD FOR MAKING THE SAME

(71) Applicant: Securitag Assembly Group Co., Ltd., Taichung (TW)

(72) Inventors: Tian-Lin Yan, Taichung (TW); Cheng-Hung Chang, Taichung (TW); Way-Yu Chen, Taichung (TW); Wen-Fan Chang, Taichung (TW)

(73) Assignee: SECURITAG ASSEMBLY GROUP CO., LTD., Taichung (TW)

( * ) Notice: Subject to any disclaimer, the term of this patent is extended or adjusted under 35 U.S.C. 154(b) by 0 days.

(21) Appl. No.: 15/081,620

(22) Filed: Mar. 25, 2016

(30) Foreign Application Priority Data

Dec. 25, 2015 (TW) .............................. 104143829 A (51) Int. Cl.
*G06K 19/06* (2006.01)
*G06K 19/07* (2006.01)
*G06K 19/077* (2006.01)

(52) U.S. Cl.
CPC ..... *G06K 19/0723* (2013.01); *G06K 19/0776* (2013.01)

(58) Field of Classification Search
USPC .................. 235/492, 451; 340/10.1; 438/107
See application file for complete search history.

(56) References Cited

U.S. PATENT DOCUMENTS

| 7,888,604 | B2 | 2/2011 | Kawate et al. |
| 8,378,917 | B2 * | 2/2013 | Yoneda .................... H01Q 1/22 343/742 |
| 8,516,683 | B2 | 8/2013 | Credelle et al. |
| 8,823,597 | B2 * | 9/2014 | Wang ................... H01Q 1/2208 343/793 |
| 8,851,356 | B1 | 10/2014 | Holec et al. |
| 2007/0008477 | A1 | 1/2007 | Huang |
| 2008/0203173 | A1 * | 8/2008 | Baba ................. G06K 19/07749 235/492 |
| 2013/0271265 | A1 * | 10/2013 | Finn ...................... H01Q 1/2225 340/10.1 |
| 2013/0320093 | A1 | 12/2013 | Lin et al. |
| 2015/0186768 | A1 * | 7/2015 | Peters .............. G06K 19/07773 235/488 |
| 2016/0003895 | A1 * | 1/2016 | Farr ...................... G01R 1/0416 324/754.03 |

FOREIGN PATENT DOCUMENTS

TW            I274949            3/2007

* cited by examiner

*Primary Examiner* — Ahshik Kim
(74) *Attorney, Agent, or Firm* — Chen Yoshimura LLP (57) ABSTRACT

The present invention provides a radio frequency identification device comprising an antenna module and a substrate module. The antenna module has a flexible substrate having an antenna circuit forming thereon. A first surface of the flexible substrate further has a first and a second electrical connecting pads coupled to the antenna circuit, wherein the antenna circuit does not pass through a space between the first and second electrical connecting pads. The substrate module comprises a RFID chip and at least one passive element electrically coupled to a substrate having a pair of third electrical connecting pads. A conductive adhesive formed between the first and second electrical connecting pads and the third electrical connecting pads is utilized to couple the antenna module with the substrate module.

31 Claims, 6 Drawing Sheets

RFID DEVICE AND METHOD FOR MAKING THE SAME

This application claims the benefit of Taiwan Patent Application Serial No. 104143829, filed Dec. 25, 2015, the subject matter of which is incorporated herein by reference.

BACKGROUND OF INVENTION

1. Field of the Invention

The present invention relates to a technology of radio frequency identification (RFID) device, and more particularly, to a RFID device and manufacturing method for making the same in which the RFID device has an antenna module bonded with a substrate module using conductive adhesive and hot pressing process.

2. Description of the Prior Art

Radio frequency identification (RFID) is a wireless communication technology, an integration of wireless information processing technology, read/write module, and RFID device. The RFID device comprises a chip circuit and antenna coil so that contactless reading and/or writing data to the RFID device through RFID reader can be performed to acquire the information stored in the RFID device. The acquired information can be processed, utilized and applied in various kinds of electronic application such as door security or access control, and vehicle immobilizer system, for example.

For the past few years, the portable electronic devices, such as smart portable devices and IC card, are popular to the public such that the need of radio frequency technology application is gradually increased. In one application, the RFID device further comprises a substrate module having RFID chipset and passive components, and an antenna module having antenna coil designed according to the requirement of frequency range and material. Conventionally, the substrate module and antenna module are electrically bonded through a reflow process. In order to prevent the substrate module and antenna module from heat damage during the reflow process, a substrate with high temperature resistant capability, such as printed circuit board (PCB) is adopted to make the substrate module; however, the way adopted for withstanding high temperature will increase the cost of making the RFID device and increasing the bulk volume and thickness dimension, as well.

In another conventional art, the substrate of antenna module is replaced by polyimide (PI) substrate. Although the PI substrate has high temperature resistant capability to withstand the reflow process, likewise, the cost of PI substrate is high thereby increasing the manufacturing cost of making RFID device.

Accordingly, there has a need to provide a radio frequency identification device and manufacture method to solve the problem of the conventional arts.

SUMMARY OF THE INVENTION

The present invention provides a RFID device and method for making the same in which the flexible substrate of antenna module is electrically connected to the substrate module having RFID chipset and passive components by conductive adhesive and hot pressing process whereby the reflow soldering process can be eliminated thereby dramatically reducing the manufacturing cost and the antenna module can be made thin and light so as to reduce the weight and package volume of the RFID device.

The present invention provides a RFID device and method of making the same wherein the area between electrical connecting pads formed on the substrate of the antenna module has no antenna coil passing therethrough so that the circuit layout of the electrical connection between the substrate module and antenna module can be less complicated thereby simplifying the manufacturing process of electrical connection between the substrate module and antenna module.

The present invention provides a RFID device and manufacturing method thereof, wherein the RFID device an be integrally coupled with an external electronic device such as camera, smart phone or the like, so that the external electronic device can perform a near field communication with other electronic device thereby increasing variety of the applications associated with the RFID device.

In one embodiment, the present invention provides a RFID device, comprising an antenna module and a substrate module. The antenna module is configured to have a flexible substrate and an antenna circuit formed thereon, wherein a first surface of the flexible substrate further comprises a first electrical connecting pad and a second electrical connecting pad coupled to the antenna circuit, respectively, wherein the antenna circuit does not pass through an area between the first and second electrical connecting pads. The substrate module is configured to have a RFID chip and at least one passive component, wherein the substrate module further comprises a pair of third electrical connecting pads respectively corresponding to the first and second electrical connecting pads, and conductive adhesives are respectively embedded between each corresponding third and first electrical connecting pads, and third and second electrical connecting pads such that one of the third electrical connecting pads is electrically connected to the first electrical connecting pad and the other third electrical connecting pad is electrically connected to the second electrical connecting pad through a hot pressing process.

In one embodiment, the present invention further provides a method for making a RFID device. At first an antenna module is provided, wherein the antenna module comprises a flexible substrate having an antenna circuit formed thereon, wherein a first surface of the flexible substrate further comprises a first electrical connecting pad and a second electrical connecting pad coupled to the antenna circuit, wherein an area between the first and second electrical connecting pads has no antenna circuit passing therethrough. Next, a substrate module is provided wherein the substrate module comprises a RFID chip, at least one passive component, and a pair of third electrical connecting pads. After that, conductive adhesive is arranged on the first and second electrical connecting pads, or on the pair of the third electrical connecting pads. Finally, a hot pressing process is utilized to make the first electrical connecting pad electrically connect to one of the third electrical connecting pads, and the second electrical connecting pad electrically connect to the other third electrical connecting pad.

All these objects achieved by the RFID device and method for making such kind device are described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a RFID device and method for making the same. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
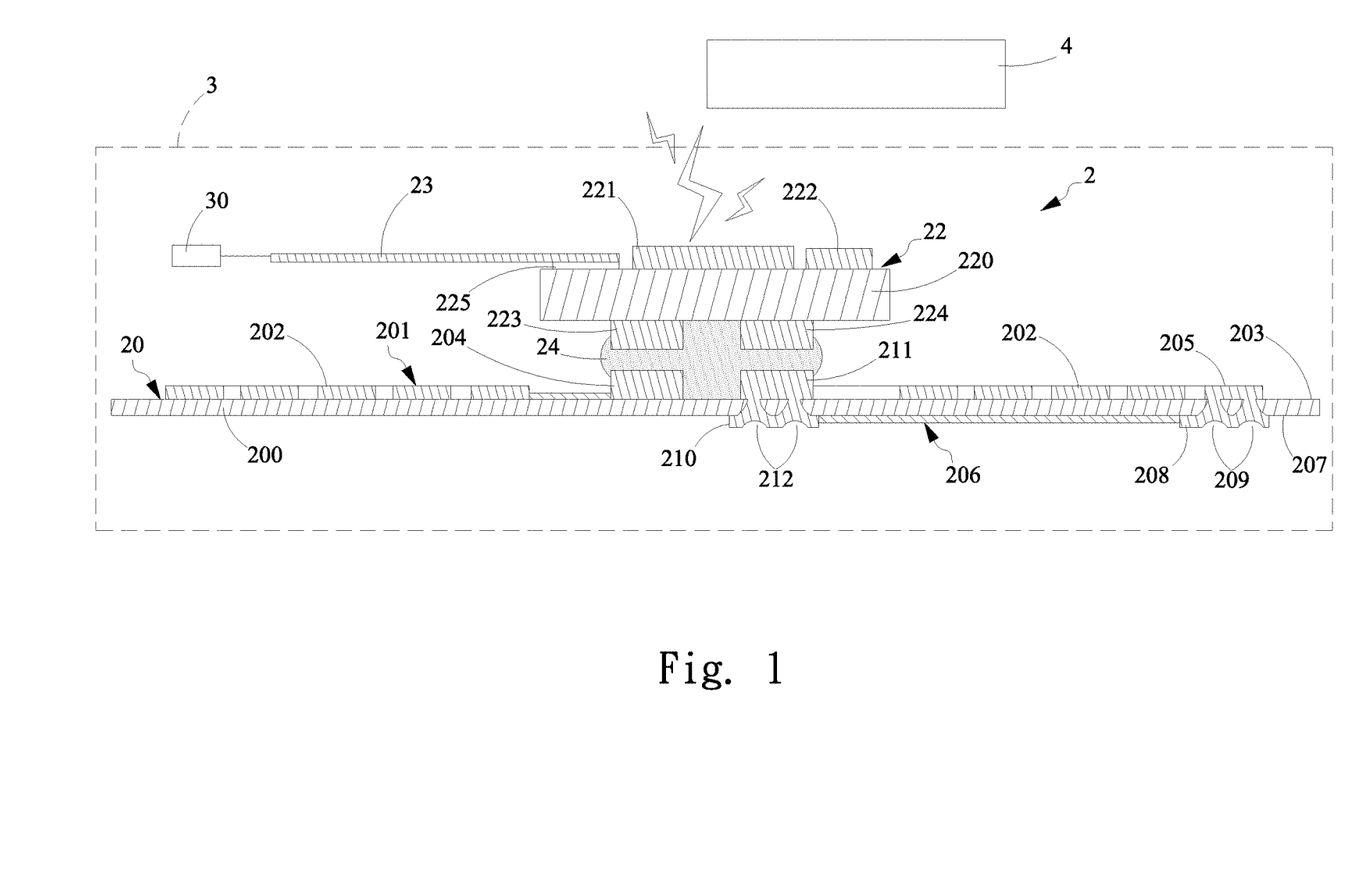
FIG. 1 illustrates a structure of RFID device according to one embodiment of the present invention.

Please refer to FIG. 1, which illustrates a structure of the radio frequency identification (RFID) device according to the one embodiment of the present invention. The RFID device 2 comprises an antenna module 20, and a substrate module 22. The antenna module 20 comprises a flexible substrate 200 and an antenna circuit 201 for receiving high frequency (HF) signal, such as 11~16 MHz, or ultra high frequency (UHF) signal, such as 800~1000 MHz.

Figure 2A:
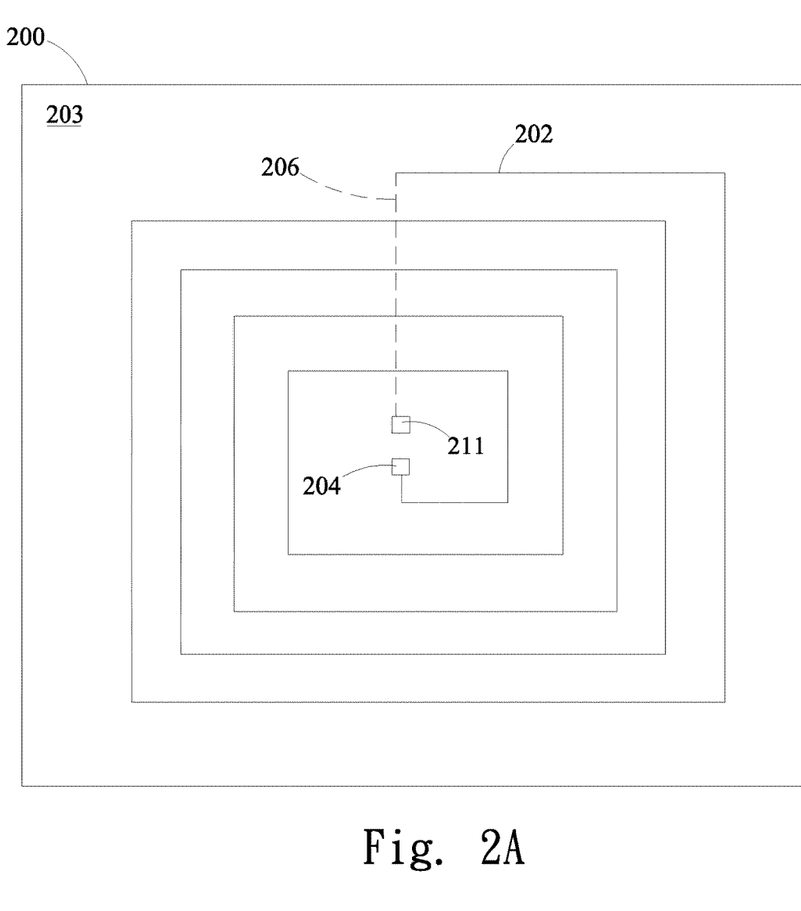
FIG. 2A illustrates the antenna circuit according to one embodiment of the present invention.

The antenna circuit 201 is formed on surface of the flexible substrate 200. In one embodiment, the antenna circuit 201 has a first antenna 202 formed on a first surface 203 of the flexible substrate 200. Please refer to FIG. 2A, wherein the first antenna 202 has a specific circuit pattern and multi-turn rectangular coil. In FIGS. 1 and 2A, one end of the antenna 202 has a first electrical connecting pad 204 while the other end of the antenna 202 is connected to a first relay pad 205. The first electrical connecting pad 204 and the first relay pad 205 can be made of metal material, such as aluminum or copper, for example. The first relay pad 205 is coupled to a relay circuit 206.

In one embodiment, the relay circuit 206 is formed on a second surface 207 opposite to the first surface 203. The first pad 205 is electrically connected to a second relay pad 208 coupled to one end of the relay circuit 206 through a crimping process. Likewise, the second relay pad 208 is made of metal material, e.g., copper and aluminum. In one embodiment, the crimping process is operated by press molding such that a plurality of areas of the second relay pad 208 are pressed to deformed by the mold through which the deformed metal penetrates through the flexible substrate 200 thereby electrically connecting to the first relay pad 205. After the crimping process, a plural recess structures corresponding to the plurality of areas 209 of the second relay pad 208 are formed.

Likewise, the other end of the relay circuit 206 is connected to a third relay pad 210 which is made of electrically conductive metal such as aluminum or copper, for example. The third relay pad 210 is crimped to connect to the second electrical connecting pad 211 formed on the first surface 203. In one embodiment, the crimping process is performed by press molding, e.g., hot press molding, such that a plurality of areas 212 of the third relay pad 210 are pressed to penetrate through the flexible substrate 200 and are electrically connected to second electrical connecting pad 211. After the crimping process, a plural recess structures respectively corresponding to the plurality of areas 212 of the third relay pad 210 are formed.

In addition, it is noted that the pattern design of the antenna circuit is determined according the actual need and it is to be understood that the invention is not limited to the specific embodiments shown in FIG. 2A. For example, please refer to FIG. 2B, which illustrates elliptical shape antenna 202 formed on a surface of the substrate 200a. The substrate 200a can be, but should not be limited to, a flexible substrate. The substrate 200a has a first electrical connecting pad 204a and a second electrical connecting pad 211a electrically connected to electrical connecting terminals 226 and 227 of the substrate module 22, respectively. The substrate module 22 is a chip on board (COB) module having integrated circuit (IC) chip 221a, such as RFID chip, and electrical components 222, such as passive components and/or detecting sensors, formed on the substrate module 22. The passive components can be, but should not be limited to, resistor, capacitor, inductor, or a combination thereof while the detecting sensor can be, but should not be limited to, a temperature sensor or humidity sensor. One end of antenna 202 is electrically connected to the first electrical connecting pad 204a while the other end of antenna 202 is connected to an electrical terminal 215b. The second electrical connecting pad 211a is electrically connected to the electrical terminal 215a through an antenna segment 214. The electrical terminals 215a and 215b penetrate through the substrate 200a and are crimped or coupled to each other through a conductive wire 216.

Figure 2B:
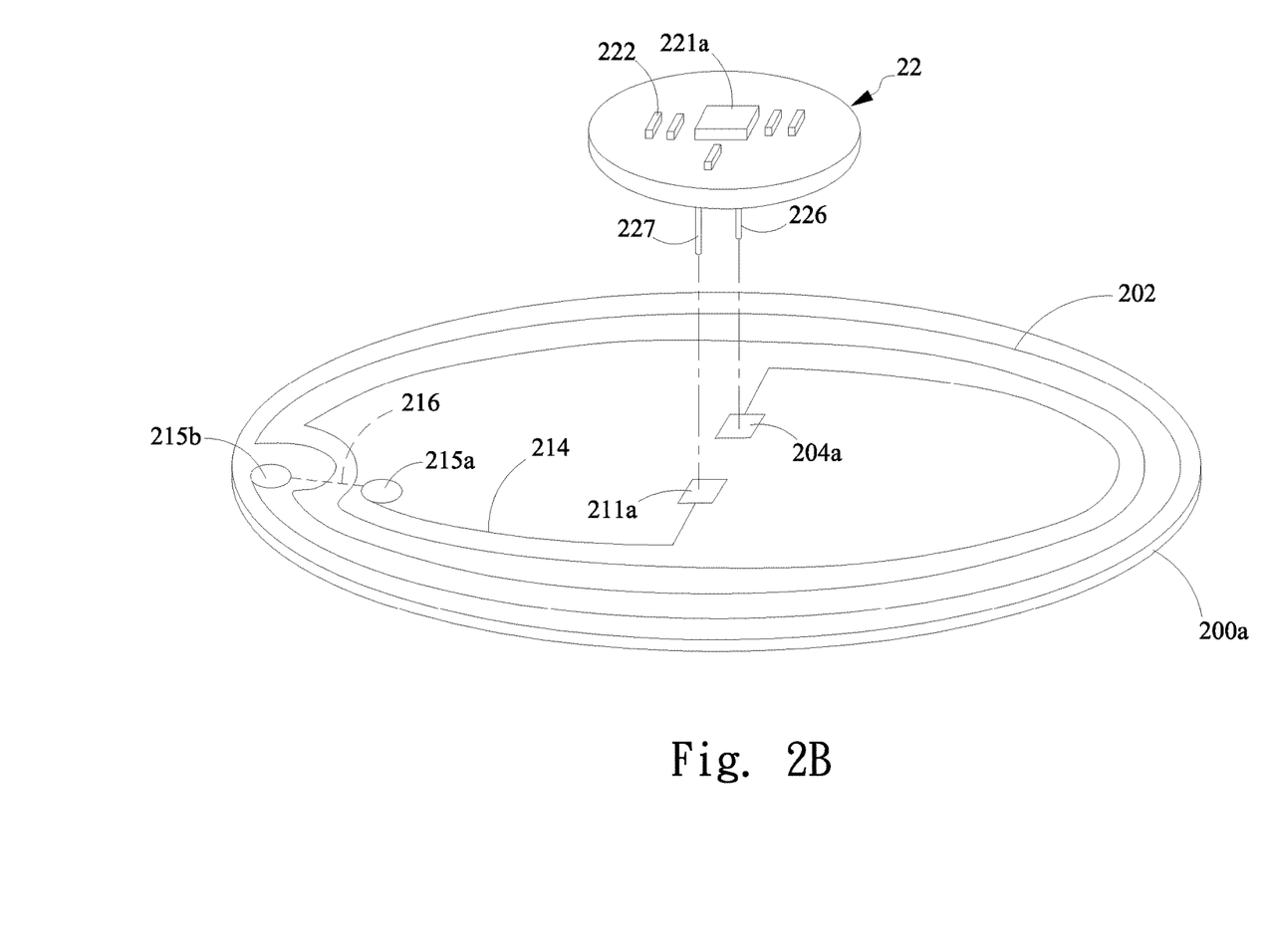
FIG. 2B illustrates the antenna circuit according to another embodiment of the present invention.

Moreover, it is noted that the aforesaid antenna circuit shown in FIGS. 1, 2A and 2B are embodiments having single antenna. In one alternative embodiment illustrated as FIG. 3, the antenna circuit 201 further comprises a second antenna 213 formed on a second surface 207 of the flexible substrate 200. One end of the second antenna 213 is electrically connected to the first electrical connecting pad 205 through a crimping process so that the second antenna 213 can be electrically connected to the first antenna 202. The other end of the second antenna 213 is electrically connected to the third relay pad 210 which is made of electrically conductive metal, such as copper and aluminum. The third relay pad 210 is coupled to the second electrical connecting pad 211 formed on the first surface 203 through the crimping process which is the same as the aforesaid process and will not be described hereinafter.

Figure 3:
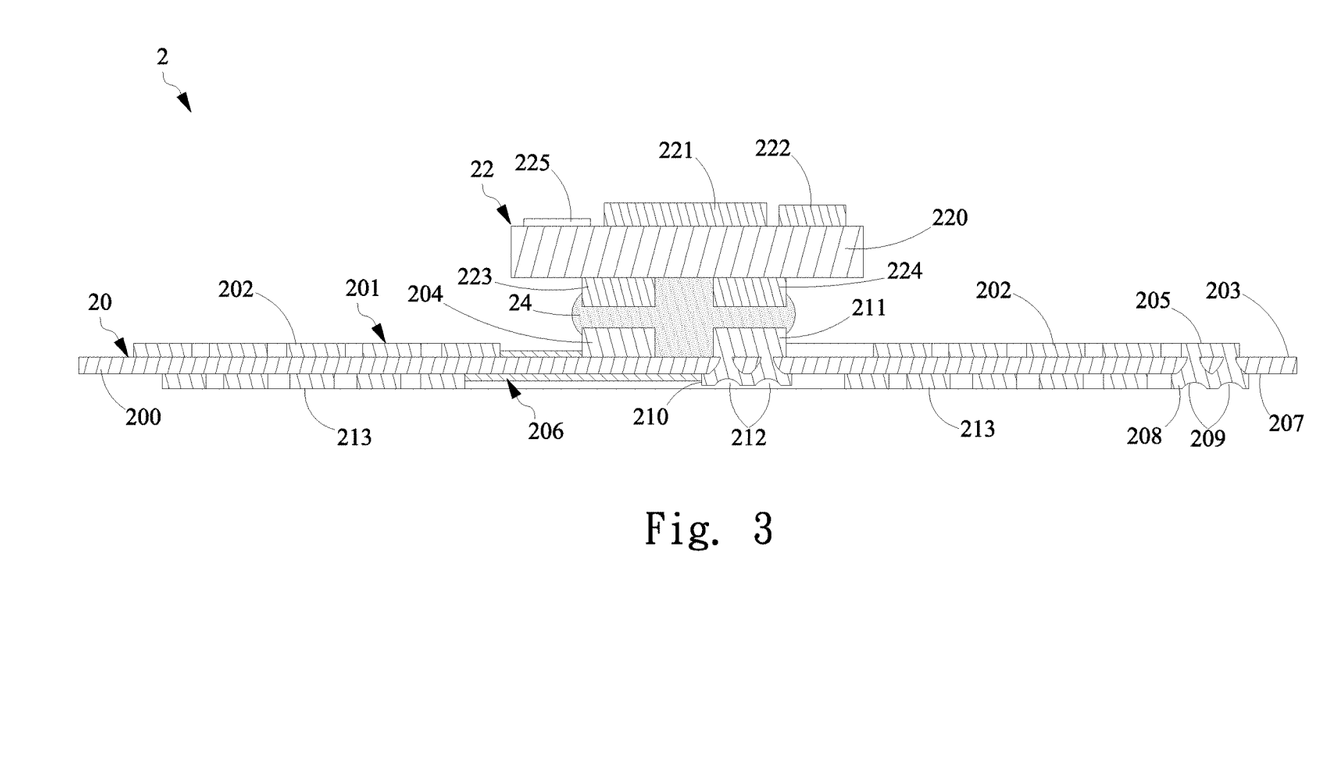
FIG. 3 illustrates a structure of RFID device according to another embodiment of the present invention.

It is noted that although the embodiments shown in FIGS. 1 and 3 illustrated that the crimping process is performed by crimping the second relay pad 208 to the first relay pad 205 as well as crimping the third relay pad 210 to the second electrical connecting pad 211, in alternative embodiment, it is possible to perform the crimping process by crimping the first relay pad 205 to the second relay pad 208 and crimping the second electrical connecting pad 211 to the third relay pad 210 whereby the recess structures of the area 209 and 212 respectively shown in FIGS. 1 and 3 will be formed on the surface of first relay pad 205 and second electrical connecting pad 211. The crimping process can be performed according to the actual need of the manufacture and can be varied by the one having ordinary skilled in the art according to the actual requirement so that it is to be understood that the invention is not limited to the specific embodiments shown in FIGS. 1 and 3.

Through the layout design of the antenna circuit shown in FIGS. 1 and 3, the first and second electrical connecting pads 204 and 211 of the antenna circuit 201 can be arranged closely and position in the same area of the substrate. That is, the antenna circuit does not pass through the area between the first and second electrical connecting pads 204 and 211 so that the problem of accidental electrical short circuit with the antenna circuit can be prevented in the subsequent manufacturing process of electrically coupling the substrate module 21 to the antenna module 20 whereby the manufacturing process of bonding the substrate module 21 and antenna module 20 can be simplified.

Referring back to FIG. 1, the substrate module 22 comprises a substrate 220, RFID chip 221, and at least one passive component 222. The substrate 220 can be a hard substrate or flexible substrate. In one embodiment, the substrate module 22 is a COB substrate module. The RFID chip 221 is coupled to the substrate 220. The at least one passive component 222 is electrically coupled to the substrate 220 and electrically coupled to the RFID chip 221. The passive component 222 can be a capacitor, resistor, inductor, or any combination thereof. The user can select appropriate components and arrange those selected components on the substrate 220 according to the requirement and characteristics of electrical circuit. The substrate 220 has a pair of third electrical connecting pads 223 and 224 coupled to the first and second electrical connecting pads 204 and 211, respectively. In the present embodiment, conductive adhesives 24 are utilized to electrically connect the first and second electrical connecting pads 204 and 211 to the third electrical connecting pads 223 and 224, respectively, through a hot pressing process.

In addition, in another alternative embodiment, the substrate 220 further comprises an electrical connecting part 225 electrically coupled to an electrical connecting interface 23. The electrical connecting interface 23 is coupled to an electronic device 3 through an electrical connecting terminal 30 for receiving information from the electronic device 3 or transmitting information to the electronic device 3. In one embodiment, the electrical connecting interface 23 can be, but should not be limited to, a flexible printed circuit (FPC). In one embodiment, the RFID device 2 is internally arranged within the electronic device 3. The electronic device 3 can be, but should not be limited to, image acquiring device, such as camera or video recorder, and smart portable device, such as smart mobile phone, or pad device. In one embodiment, the information generated by the electronic device 3 can be transmitted to the substrate module 22 through the electrical connecting interface 23. The substrate module 22 then converts the information into radio frequency signal in accordance with the radio frequency communication standard. The radio frequency signal is transmitted wirelessly to remote electronic device through the antenna module. In contrast, one remote electronic device 4 can transmit radio frequency signal to the RFID device 2. The RFID device 2 receives the radio frequency signal, converts it into electrical signal and transmits the converted electrical signal to the electronic device 3 through the electrical connecting interface 23.

Next, a method for making the RFID device is explained below. Please refer to FIG. 4A, which illustrates a first step of making the RFID device. At first, an antenna module 20 is provided. The antenna module comprises a flexible substrate 200 having an antenna circuit 201 formed thereon. The thickness of the flexible substrate 200 is around 0.05~0.5 μm. A first surface 203 of the flexible substrate 200 further comprises a first electrical connecting pad 204 and a second electrical connecting pad 211. The antenna circuit 201 can be formed on one surface or both surfaces of the flexible substrate 200.

One embodiment of forming the antenna circuit 201 on the first surface 203 of the flexible substrate 200 is metal etching process such as aluminum etching or copper etching process. That is, a metal layer, such as aluminum layer or copper layer, is formed on the surface of the flexible substrate 200 and then the metal layer is etched to form a first antenna 202. The pattern can be, but should not be limited to, the pattern shown in FIG. 2A or FIG. 2B. Thereafter, the first antenna 202 is electrically connected to the first electrical connecting pad 204. Since the first antenna 202 is a multi-turn coil like the pattern shown in FIG. 2A, the first and second electrical connecting pads 204 and 211 can be arranged close to each in the same area of the substrate. That is, there is no antenna circuit passing through the space between the first and second electrical connecting pads 204 and 211, so as to simplify circuit layout design of the substrate module whereby short circuit with the antenna circuit in the subsequent manufacturing process can be effectively prevented.

Figure 4A:
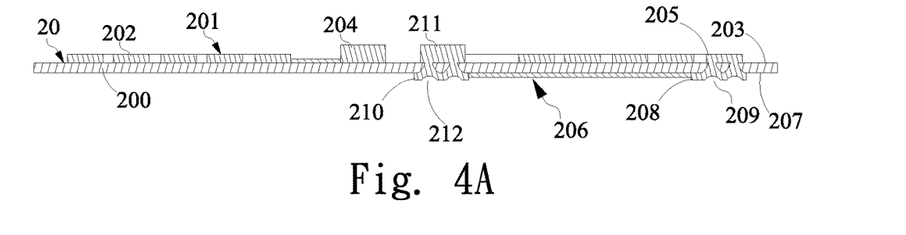
FIGS. 4A to 4E illustrate a flow of manufacturing process for making RFID device according to one embodiment of the present invention.

Next, a relay circuit 206 is formed on a second surface 207 of the flexible substrate 200. In one embodiment, the relay circuit 206 is formed by metal etching process, such as aluminum etching or copper etching process. After that, a first end of the relay circuit 206 is crimped to electrically connect to a second end of the first antenna 202. In the crimping step, the first end of the relay circuit 206 is connected to a relay pad 208, and a press molding is utilized to press a plurality of areas 209 of the relay pad 208 so that the pressed areas 209 of the relay pad 208 penetrate through the flexible substrate 200 and electrically connect to a relay pad 205 coupled to the second end of the first antenna 202. It is noted that the crimping process can also be performed by pressing a plurality areas of the second relay pad 205 such that the pressed areas penetrate through the flexible substrate and electrically connected to relay pad 208 coupled to the first end of the relay circuit 206.

Finally, a second end of the relay circuit 206 is electrically connected to a second electrical connecting pad 211 through crimping process. In the crimping process of the final step, a press molding is utilized to press a plurality of areas 212 of the relay pad 210 coupled to the second end of the relay circuit 206 so that the pressed areas 212 of the relay pad 210 penetrate through the flexible substrate 200 and electrically connect to the second electrical connecting pad 211. Alternatively, the crimping process can also be performed by pressing a plurality areas of the second electrical connecting pad 211 such that the pressed areas penetrate through the flexible substrate 200 and electrically connected to relay pad 210 coupled to the second end of the relay circuit 206.

In another alternative embodiment, a second antenna 213 like the embodiment shown in FIG. 3 is further formed on a second surface 207 of the flexible substrate 200. Likewise, the second antenna 213 can be formed by metal etching process, such as aluminum etching or copper etching process. After that, a first end of the second antenna 213 is electrically connected to the relay pad 210 coupled to the relay circuit 206. The relay pad 210 is further crimped to electrically connect to the second electrical connecting pad 211. The crimping process is the same as the above-described process. Another end of the second antenna 213 is electrically connected to the relay pad 208. Then, the relay pad 208 is crimped to electrically connect to the relay pad 205 coupled to the second end of the first antenna 202 through crimping process. The crimping process which is the same as the process previously described will not be described hereinafter.

Figure 4B:
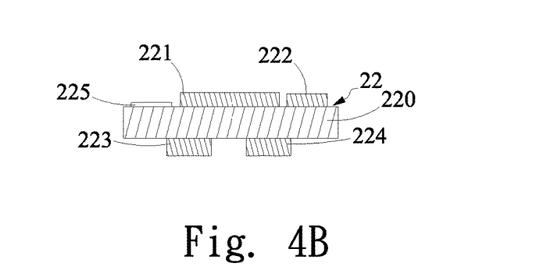

Please refer to the FIG. 4B, after step shown in FIG. 4A, a substrate module 22 comprising a substrate 220 having a RFID chip 221 and at least one passive component 222 formed thereon is provided. The substrate module 22 further comprises a pair of third electrical connecting pads 223 and 224. The substrate 220, in the present embodiment, is a hard substrate. In another alternative embodiment, the substrate 220 can also be a flexible substrate.

Figure 4C:
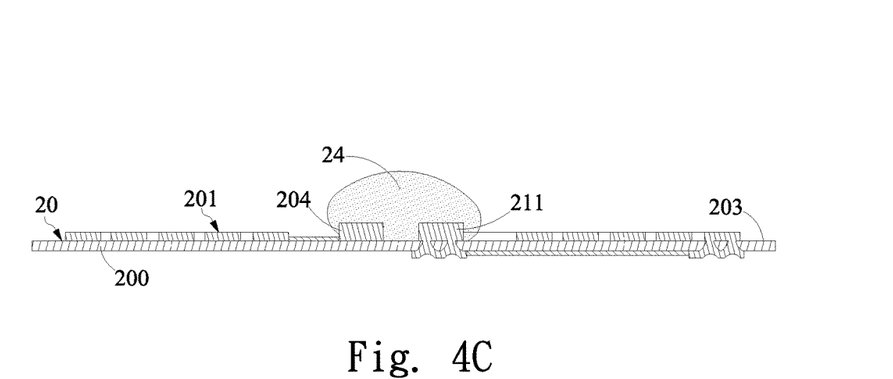

Please refer to FIG. 4C, after step shown in FIG. 4B, a conductive adhesive 24 is formed on the first and second electrical connecting pads 204 and 211. In the present embodiment, the conductive adhesive 24, such as anisotropic conductive film (ACF), anisotropic conductive paste (ACP), or anisotropic conductive adhesive (ACA) or SACP, is electrically conductive adhesive that can be utilized in the hot pressing process. In one embodiment, the amount of the conductive adhesive is smaller or equal to 0.2 mg.

Figure 4D:
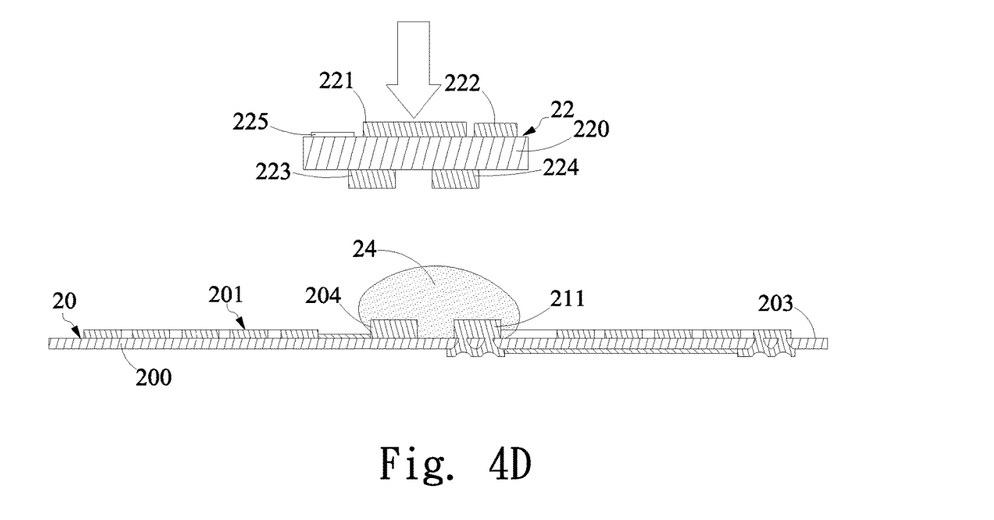
Figure 4E:
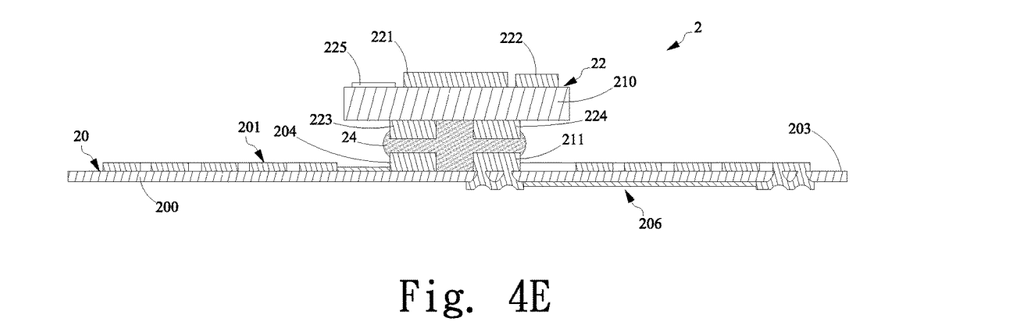

After that, please refer to FIG. 4D, a hot pressing process is adapted for electrically connecting the pair of the third electrical connecting pads 223 and 224 to the first and second electrical connecting pads 204 and 211. In one embodiment, the temperature for operating the hot pressing process is lower than or equal to 200° C., and the pressing time is shorter than or equal to 20 seconds. After the hot pressing process, the substrate module 22 and antenna module 20 are bonded as the structure shown in FIG. 4E. The apparatus for hot pressing process which is well known by the one having ordinary skilled in the art will not be described hereinafter. It is noted that, the conductive adhesive 24 can also be coated on the third pair of the electrical connecting pads 223 and 224, and the first and second electrical connecting pads 204 and 211 are pressed to electrically connect to the third pair of electrical connecting pads 223 and 224.

The RFID device, i.e., a combination of antenna module 20 and substrate module 22 after the hot pressing process, can be adapted to further electrically connect to the electronic device through a flexible printed circuit (FPC) interface. In one embodiment, the RFID device is internally embedded within the electronic device whereby the electronic device can have wireless communicating capability for performing near field communication with other electronic devices such that the application fields of the electronic device and RFID device can be further expanded.

According to the above-described embodiments about the RFID device and method for making such kind device, since the flexible substrate of antenna module is electrically connected to the substrate module having RFID chipset and passive components through conductive adhesive and hot pressing process whereby the reflow soldering process can be eliminated thereby dramatically saving the cost associated with manufacturing, and the antenna module can also be made thin and light so as to reduce the weight and package volume of the RFID device. Moreover, the area between electrical connecting pads formed on the substrate of the antenna module has no antenna coil passing therethrough such that the circuit layout of the electrical connection between the substrate module and antenna module can be less complicated thereby simplifying the manufacturing process of connection between the substrate module and antenna module and preventing short circuit with the antenna circuit from being occurred.

While an antenna module is described in the above embodiments, the invention can more broadly be applied to other electrical device modules which convert electric power into radio waves. Also, While an antenna module is described in the above embodiments, the invention can more broadly be applied to other circuit board modules.

While the present invention has been particularly shown and described with reference to a preferred embodiment, it will be understood by those skilled in the art that various changes in form and detail may be without departing from the spirit and scope of the present invention.

What is claimed is:

1. A radio frequency identification (RFID) device, comprising:
 an antenna module, including a flexible substrate, an antenna circuit formed on the flexible substrate, and a first electrical connecting pad and a second electrical connecting pad formed on a first surface of the flexible substrate and coupled to the antenna circuit, wherein the antenna circuit does not pass through an area between the first and second electrical connecting pads;
 a substrate module, including an RFID chip, at least one passive component, and a pair of third electrical connecting pads respectively corresponding to the first and second electrical connecting pads; and
 a conductive adhesive disposed between each corresponding third and first electrical connecting pads and third and second electrical connecting pads, wherein one of the third electrical connecting pad is electrically connected to the first electrical connecting pad and the other third electrical connecting pad is electrically connected to the second electrical connecting pad by the conductive adhesive.

2. The device according to the claim 1, wherein the antenna circuit comprises:
 a first antenna, formed on the first surface of the flexible substrate and having a first end electrically coupled to the first electrical connecting pad; and
 a rely circuit, formed on a second surface of the flexible substrate and having a first end crimped to a second end of the first antenna, and a second end crimped to the second electrical connecting pad.

3. The device of claim 2, wherein the antenna circuit further comprises a second antenna formed on the second surface and electrically coupled to the first antenna.

4. The device of claim 2, wherein a plurality of areas of the second electrical connecting pad penetrate through the flexible substrate and are electrically connected to the second end of the relay circuit, or a plurality areas of the second end of the relay circuit penetrate through the flexible substrate and are electrically connected to the second electrical connecting pad, and a plurality of areas of the first end of the relay circuit penetrate through the flexible substrate and are electrically connected to the second end of the first antenna or a plurality of areas of the second end of the first antenna penetrate through the flexible substrate and are electrically connected to the first end of the relay circuit.

5. The device of claim 3, wherein the first end of the second antenna is electrically coupled to a relay pad of the relay circuit, a plurality of areas of the second electrical connecting pad penetrate through the flexible substrate and are electrically connected to the relay pad of the relay circuit, or a plurality areas of the relay pad of the relay circuit penetrate through the flexible substrate and are electrically connected to the second electrical connecting pad, and a plurality of areas of the second end of the second antenna penetrate through the flexible substrate and are electrically connected to the second end of the first antenna or a plurality of areas of the second end of the first antenna penetrate through the flexible substrate and are electrically connected to the second end of the second antenna.

6. The device of claim 1, wherein the substrate module further comprises a connection interface electrically coupled to an electronic device for receiving information from the electronic device, and the received information are transmitted by the antenna module.

7. The device of claim 6, wherein the RFID device is embedded in the electronic device.

8. The device of claim 1, wherein the conductive adhesive forms the electrical connection between the one of the third electrical connecting pad and the first electrical connecting pad and between the other third electrical connecting pad and the second electrical connecting pad through a hot pressing process which is performed under a temperature lower than or equal to 200° C. and the pressing time is smaller or equal to 20 seconds.

9. The device of claim 1, wherein a mass of the conductive adhesives is smaller or equal to 0.2 mg.

10. The device of claim 1, wherein the conductive adhesives is anisotropic conductive paste (ACP), anisotropic conductive film (ACF) or anisotropic conductive adhesive (ACA).

11. The device of claim 1, wherein the substrate module is a chip on board (COB) substrate module.

12. A method for making a radio frequency identification (RFID) device, comprising:
   providing an antenna module, which includes a flexible substrate, an antenna circuit formed on the flexible substrate, and a first electrical connecting pad and a second electrical connecting pad formed on a first surface of the flexible substrate and coupled to the antenna circuit, wherein the antenna circuit does not pass through an area between the first and second electrical connecting pads;
   providing a substrate module, which includes an RFID chip, at least one passive component, and a pair of third electrical connecting pad;
   providing a conductive adhesive on the first and second electrical connecting pads, or on the pair of the third electrical connecting pads; and
   connecting electrically the first electrical connecting pad to one of the third electrical connecting pads, and the second electrical connecting pad to another one of the third electrical connecting pads through a hot pressing process.

13. The method of claim 12, wherein the step of providing the antenna module comprises:
   providing the flexible substrate;
   forming a first antenna on the first surface of the flexible substrate by a first metal etching process;
   forming a relay circuit on a second surface of the flexible substrate by a second metal etching process;
   connecting electrically a first end of the relay circuit to a second end of the first antenna by a crimping process; and
   connecting electrically a second end of the relay circuit to the second electrical connecting pad by the crimping process.

14. The method of claim 13, wherein the crimping process comprises:
   enabling a plurality of areas of the second electrical connecting pad to penetrate the flexible substrate and to electrically connect to the second end of the relay circuit, or enabling a plurality of areas of the second end of the relay circuit to penetrate through the flexible substrate and to electrically connect to the second electrical connecting pad; and
   enabling a plurality of areas of the first end of the relay circuit to penetrate through the flexible substrate and to electrically connect to the second end of the first antenna, or enabling a plurality of areas of the second end of the first antenna to penetrate through the flexible substrate and to electrically connect to the first end of the relay circuit.

15. The method of claim 12, wherein the step of providing the antenna module further comprises:
   forming a second antenna on a second surface of the flexible substrate; and
   connecting electrically the second antenna to the first antenna.

16. The method of claim 15, wherein the step of connecting electrically the second antenna to the first antenna comprises:
   connecting electrically a first end of the second antenna to a relay pad of the relay circuit;
   enabling a plurality of areas of the second electrical connecting pad to penetrate the flexible substrate and to electrically connect to the relay pad, or enabling a plurality of areas of the relay pad to penetrate through the flexible substrate and to electrically connect to the second electrical connecting pad; and
   enabling a plurality of areas of the second end of the second antenna to penetrate through the flexible substrate and to electrically connect to the second end of the first antenna, or enabling a plurality of areas of the second end of the first antenna to penetrate through the flexible substrate and to electrically connect to the second end of the second antenna.

17. The method of claim 12, further comprising:
   forming a connection interface on the substrate module; and
   connecting electrically the connection interface to an electronic device, wherein information from the electronic device is received by the substrate module through the connection interface and the received information is wirelessly transmitted through the antenna module.

18. The method of claim 17, wherein the RFID device is embedded in the electronic device.

19. The method of claim 12, wherein the hot pressing process is performed under a temperature lower than or equal to 200° C. and a pressing time is shorter than or equal to 20 seconds.

20. The method of claim 12, wherein a mass of the conductive adhesive is smaller or equal to 0.2 mg.

21. The method of claim 12, wherein the conductive adhesive is anisotropic conductive film (ACF), anisotropic conductive paste (ACP), or anisotropic conductive adhesive (ACA).

22. The method of claim 12, wherein the substrate module is a chip on board (COB) substrate module.

23. A radio frequency identification (RFID) device, comprising:
   an electrical device module which converts electric power into radio waves, including a flexible substrate, an antenna circuit formed on the flexible substrate, and a first electrical connecting pad and a second electrical connecting pad formed on a first surface of the flexible substrate and coupled to the antenna circuit, wherein the antenna circuit does not pass through an area between the first and second electrical connecting pads;
   a circuit board module, including an RFID chip, at least one passive component, and a pair of third electrical connecting pads respectively corresponding to the first and second electrical connecting pads; and
   a conductive adhesive disposed between each corresponding third and first electrical connecting pads and third and second electrical connecting pads, wherein one of the third electrical connecting pad is electrically connected to the first electrical connecting pad and the other third electrical connecting pad is electrically connected to the second electrical connecting pad through a hot pressing process.

24. The device according to the claim 23, wherein the antenna circuit comprises:
a first antenna, formed on the first surface of the flexible substrate and having a first end electrically coupled to the first electrical connecting pad; and
a rely circuit, formed on a second surface of the flexible substrate and having a first end crimped to a second end of the first antenna, and a second end crimped to the second electrical connecting pad.

25. The device of claim 24, wherein the antenna circuit further comprises a second antenna formed on the second surface and electrically coupled to the first antenna.

26. The device of claim 24, wherein a plurality of areas of the second electrical connecting pad penetrate through the flexible substrate and are electrically connected to the second end of the relay circuit, or a plurality areas of the second end of the relay circuit penetrate through the flexible substrate and are electrically connected to the second electrical connecting pad, and a plurality of areas of the first end of the relay circuit penetrate through the flexible substrate and are electrically connected to the second end of the first antenna or a plurality of areas of the second end of the first antenna penetrate through the flexible substrate and are electrically connected to the first end of the relay circuit.

27. The device of claim 25, wherein the first end of the second antenna is electrically coupled to a relay pad of the relay circuit, a plurality of areas of the second electrical connecting pad penetrate through the flexible substrate and are electrically connected to the relay pad of the relay circuit, or a plurality areas of the relay pad of the relay circuit penetrate through the flexible substrate and are electrically connected to the second electrical connecting pad, and a plurality of areas of the second end of the second antenna penetrate through the flexible substrate and are electrically connected to the second end of the first antenna or a plurality of areas of the second end of the first antenna penetrate through the flexible substrate and are electrically connected to the second end of the second antenna.

28. The device of claim 23, wherein the circuit board module further comprises a connection interface electrically coupled to an electronic device for receiving information from the electronic device, and the received information are transmitted by the antenna module, and the RFID device is embedded in the electronic device.

29. The device of claim 23, wherein the hot pressing process is performed under a temperature lower than or equal to 200° C. and the pressing time is smaller or equal to 20 seconds.

30. The device of claim 23, wherein the conductive adhesives is anisotropic conductive paste (ACP), anisotropic conductive film (ACF) or anisotropic conductive adhesive (ACA), and a mass of the conductive adhesives is smaller or equal to 0.2 mg.

31. The device of claim 23, wherein the circuit board module is a chip on board (COB) substrate module.

* * * * *